United States Patent Office 3,318,770
Patented May 9, 1967

3,318,770
INTRAVENOUSLY INJECTABLE ANESTHETIC COMPOSITION
Henning Asche, Basel, and Charles J. Morel, Basel-Land, Switzerland, assignors to Geigy Chemical Corporation, Greenburgh, N.Y., a corporation of Delaware
No Drawing. Filed Feb. 7, 1964, Ser. No. 343,417
Claims priority, application Switzerland, Jan. 16, 1964, 480/64; Aug. 29, 1963, 10,674/63, 10,675/63
4 Claims. (Cl. 167—52)

This invention relates to injectable anesthetic agents and to their preparation. More particularly, it concerns injectable anesthetic agents which contain N,N-disubstituted, and particular N,N-di-alkyl-substituted 2-alkoxy-4-alkyl-phenoxyacetic acid amides as active anesthetic ingredient.

The production of N,N-disubstituted 2-alkoxy-4-alkyl-phenoxyacetic acid amides, particularly dialkylamides, having valuable pharmacological properties, in particular anesthetic activity of short duration, is described in German Patent No. 1,123,314. Among these compounds, 2-ethoxy-4-n-propyl-phenoxy-acetic acid diethylamide is particularly active. This compound, like its homologs and analogs, is a neutral substance which is insoluble in water. In order to utilize its excellent anesthetic activity by means of parenteral, particularly intravenous, injection, it is necesary to disperse it in a suitable manner in a medium which can be administered parenterally.

It is, therefore, an object of the invention to provide an injectable, short-acting anesthetic agent containing N,N-di-(lower alkyl)-substituted 2-ethoxy - 4 - (lower alkyl)-phenoxyacetic acid amide, and preferably N,N-di-(lower alkyl)-, especially N,N-di-ethyl-substituted 2-ethoxy-4-n-propyl-phenoxyacetic acid amide as the anesthetically active ingredient and which, when applied in dosages having the same anesthetizing effect as the known agents, is free from undesirable side-effects, such as haemolytic action and, particularly, affection of the vein walls (vascular walls), and which is stable in a state of high, preferably monomolecular dispersion (solution), of constant, easily reproduceable composition, and of essentially constant pH-value in the range of about 4.0 to 5.5, and preferably 4.5 to 5.0, which is known to be the preferred range for parenterally applicable agents of this type.

It is another important object of the invention to provide a parenterally applicable, especially intravenously injectable, short-acting anesthetic agent which is well tolerated when applied quickly, in spite of the fact that the volume of the liquid agent to be injected is relatively large (in the order of 10 milliliters per shot); quick application being necessary with these agents in order to achieve full anesthetizing effect.

Various injectionable anesthetic agents have already been proposed, all of which suffer, however, from one or several drawbacks.

The production of aqueous solutions of the aforesaid active compounds, which are suitable for intravenous injection, as they are required for use as narcotics, can only be achieved successfully with the use of solubilizers.

Aqueous mixtures containing from 1 to 5% (weight/volume) of N-mono- or N,N-di-substituted 2-methoxy-4-alkyl or 4-alkenyl-phenoxyacetic acid amide have been described which contain up to 40% by volume of propylene glycol and up to 15% of sodium benzoate or sodium hydroxybenzoate as solubilizer.

In addition, water-soluble salts of bile acids such as sodium dehydrocholate, morpholine desoxycholate or ethanolamine cholate have been suggested as solubilizers specifically for 2-methoxy-4-allyl-phenoxyacetic acid diethylamide and salts of α-naphthylacetic acid with sodium or organic bases such as morpholine and diethanolamine have been suggested as solubilizers for the above compound as well as other N,N-disubstituted lower alkoxyalkenyl-phenoxyacetic acid amides and lower alkoxyalkyl-phenoxyacetic acid amides.

However, the resulting solutions which have been applied in the above-described relative large volumes by the aforesaid "quick-shot" type of injection cause considerable irritation of the vein wall. A further drawback resides in the fact that active material immediately separates out in the form of droplets when diluted with water or with serum.

Another dispersion principle involves emulsification of 2-alkoxy-phenoxyacetic acid dialkylamides substituted in the 4-position by a lower alkyl, alkenyl, α-oxoalkyl or α-hydroxyalkyl radical in water, using lecithin preparations free from histamine and pyrogen and having a low content of inositol phosphatide and oil, and optionally partial glycerides of higher fatty acid such as mono- or di-olein, and/or their polyoxyethylene derivatives as auxiliary emulsifying agents. These last-mentioned types of emulsions of sufficient stability for intravenous application in medical practice are better tolerated by the blood vessels than the first-mentioned, known solution; however, since their production is dependent on lecithin, which is a complex crude substance of varying quality and composition, it is very difficult, in reproducing the agents, to maintain a constant quality (average particle size) of emulsion.

Further attempts have been made to use, instead of solutions, emulsions of the mentioned aryloxyacetic acid amides in water. Emulsions of this type show a good venous compatability, however, their technical production is not simple, since very high demands as to stability must be made on an intravenously injectable emulsion. Thus, the emulsion should be sterilizable without any large change in pH, and the diameter of the largest particles contained therein should not exceed 5 microns. During the entire storage time, there should be no agglomeration that would lead to larger particle sizes, for injection with agents which have deteriorated in this respect may cause clogging of the fine arterioles by larger particles, and this may lead to oil embolisms.

Furthermore, when lack of stability of anesthetic agent in the form of an emulsion or a solution leads to a gradual decrease in the pH value of the agent, which may particularly occur during storage in a tropical climate without adaquate refrigerating facilities, to a pH below the preferred limit of 4.5, the afore-mentioned damage to vein walls may also occur with agents that, under moderate climatic conditions, are free from such drawbacks.

More recently, the use of well water-soluble, non-ionic, surface-active materials, such as sugar esters, or of condensation products of ethylene oxide with fatty acids, fatty alcohols, fatty oils and fatty acid esters of sorbitan, as solubilizers in anesthetic agents of the type described has permitted production of well-tolerated aqueous solutions of the aforesaid anesthetically-active phenyloxyacetic acid amides, which are suitable for intravenous application.

Among such water- and oil-soluble, non-ionogenic substances, emulsifiers which are polyoxyethylene derivatives of ricinoleic acid, commercially available as Cremophor or Mulgofen, have been particularly recommended as solubilizers for therapeutically active substances, including, for instance, vitamin A (Stüttgen et al., Arzneimittelforschung, 8, pp. 161–162 (1958)), of good venous compatibility and toleration in intravenous injection into rabbits (Badische Aniline- & Soda-Fabrik A.-G.—pamphlet No. 7,677 (555) dated June 1957).

However, when, in the last-mentioned agents the medicaments of oily character, such as vitamin A, are replaced by difficulty water-soluble anesthetically active 2-alkoxy- 4-alkyl phenoxyacetic acid amides such as 2-methoxy-4-n-propyl-phenoxyacetic acid-N,N-diethylamide, 2-methoxy-4-propenyl-pheonoxyacetic acid-N,N-diethylamide, 2-ethoxy-4-n-propyl-phenoxyacetic acid-N,N-dimethyl- or diethylamide 2-ethoxy-4-(1'-hydroxy-n-propyl)-phenoxyacetic acid-N,N-dimethyl- or diethylamide, 2-methoxy- and 2-ethoxy-4-allyl-phenoxy-acetic acid-N,N-diethylamide, 2-ethoxy-4-acetyl-phenoxyacetic acid-N,N-diethylamide, 2-methoxy-4-buten-3'-onyl-phenoxyacetic acid-N,N-diethylamide, ethyl, n-propyl or allyl, 3-methoxy-4-N,N-diethylcarbamido-methoxy-phenyl-acetates, methyl, ethyl or n-propyl esters of 3-methoxy-4-N,N-diethylcarbamido-methoxy-benzoic acid, or by 2-methoxy-4-n-propyl-phenoxyacetic acid-N-ethyl-N-ethoxyamide, solutions are obtained which have a varying degree of anesthetic activity, but all of which still show a decreasing pH, not only during sterilization, but also upon storage, especially under the afore-mentioned tropical conditions, and which, moreover, show a noticeable irritating effect on the vascular walls.

It has now been found that, surprisingly, the above-enumerated objects are attained and all drawbacks of the known solutions or emulsions are avoided by providing anesthetic agents according to the invention, which comprise:

(a) A 2-lower alkoxy-4-lower alkyl-phenoxyacetic acid-N,N-di-(lower alkyl)-amide, preferably, 2-ethoxy-4-n-propyl-phenoxyacetic acid-N,N-diethylamide, in amounts of 1 to 5, and preferably about 2.5 to 3.5% (all percentages herein and in the appended claims being given by weight, calculated on the total volume of the mixture, (w./v.), unless expressely stated otherwise).

(b) A condensation product of ricinoleic acid, hydrogenated ricinoleic acid, mixtures of both, and/or their triglycerides (castor oil in the case of ricinoleic acid), diglycerides or monoglycerides, with from 30 to 90, and preferably from 40 to 80 molar equivalents of ethylene oxide, in amounts of from 10 to 25%, and preferably from about 15 to 20%.

(c) A non-toxic, pharmaceutically acceptable propylene-glycol type solvent miscible with (b) and in all proportions with water, preferably propane-1,2-diol, glycerol or triethylene glycol in amounts of about 5% to 15%, and preferably about 8 to 12%, and (d) A poly-(N-vinyl-2-pyrrolidone) having a mean molecular weight of about 20,000 to 25,000 in amounts of about 1 to 5%, and preferably about 1.5 to 3%; and, optionally, (e) Glucose in an amount of up to about 1.5%, the balance consisting essentially of distilled water.

It is particularly surprising that the above-defined compositions according to the invention have viscosities in the range of about 9 to 12 centistokes, and usually about 10 to 10.5 centistokes at 20° C., which are thus well below the viscosities of agents consisting essentially of an active substance as defined under (a) and a surface-active agent as defined under (b), optionally with an addition of glucose as defined under (e), which compositions have viscosities in the order of 14.5 to 15 centistokes (20° C.); in spite of the fact that the additive defined under (d) acts normally as a thickener.

This lower viscosity range means a greater tolerance during "quick shot" type injections, and, consequently, a better guarantee of full anesthesia.

As another advantage, the above-defined compositions according to the invention show, compared with the last-mentioned mixtures of components (a), (b) and (e), a remarkable pH stability. Thus, pH values before and after sterilization, and after several weeks storage of the compositions according to the invention at elevated temperature (40° C. to 60° C.) remain practically constant, at a value of about 4.5. In contrast thereto, mixtures containing only the ingredients (a), (b) and (e) show a distinct drop in the pH already during sterilization, amounting in some instances to almost 1 pH unit, which decrease continues during storage at elevated temperatures, particularly in tropical climates.

It is also noteworthy that omission of the solubilizer defined under (c) from the compositions according to the invention leads to mixtures which cause beginning of hemolysis of erythrocytes in citrated human blood after about 30 minutes, with precipitations beginning to be formed after 2 minutes. In contrast thereto, the compositions according to the invention show no change in the shape of erythrocytes during 60 minutes, and no hemolytic effect during the last-mentioned period.

The compositions according to the invention are clear, transparent solutions. They can be mixed with water to any extent and the temperature at which they turn turbid is relatively high. Their low viscosity is of particular advantage for injection purposes. The dispersions according to the invention are suitable, e.g. for intravenous injection to produce anesthesia in painful but short operations such as extractions of finger nails, incisions of abcesses, joint reduction, removal of pins, etc. The initial dosage of 2-ethoxy-4-n-propyl-phenoxyacetic acid diethylamide for adults is between about 125 and 300 mg. depending on the body weight. If desired, anesthesia can be continued by smaller maintenance doses.

In cases where traces of extraneous ionogenic substances cause the initial pH of freshly prepared compositions according to the invention to lie somewhat below the above-mentioned desired range, addition of a very small amount of usually less than 0.1%, preferably less than 0.01% of a non-toxic, pharmaceutically acceptable, water-soluble mono- and/or di-phosphate, especially sodium mono- or di-phosphate or potassium mono- or di-phosphate, permits adjustment to the desired initial pH above 4.5.

The following non-limitative examples further illustrate the invention. The temperatures are given in degrees centigrade. The relationship of parts by weight to parts by volume is that of grams (g.) to milliliters (ml.).

*Example 1*

2.5 g. of 2-ethoxy-4-n-propyl-phenoxyacetic acid diethylamide are dissolved, while slightly heating, in a mixture of 15.0 g. of polyoxyethylated castor oil (50–70 ethylene oxide units for each ricinoleic acid triglyceride unit) and 10.0 g. of propylene glycol. 2.5 g. of biologically tested poly-(N-vinyl-2-pyrrolidone) with an average molecular weight of 20,000–25,000 (Kollidon 25) and 1.5 g. of glucose are dissolved in 60 g. of distilled water. The two solutions are mixed and made up to 100 ml. with distilled water. After filtration through a glass filter G4, the solution is filled into colorless 5 or 10 ml. ampoules and sterilized in an autoclave for 20 minutes at 120° and 1 atmosphere gauge pressure. The solutions so produced contain 25 milligrams (mg.) of active substance per milliliter.

*Example 2*

A similar solution containing 25 mg./ml. of active substance is obtained analogously to Example 1 by replacing with otherwise unchanged composition, the polyoxyethylated castor oil used therein by 17.5 g. of polyoxyethylated ricinoleic acid diglyceride (with 40–60 ethylene oxide units per diglyceride unit).

*Example 3*

A similar solution containing 25 mg./ml. of active substance is obtained analogously to Example 1 by replacing in the otherwise unchanged composition ,the polyoxyethylated castor oil used therein by 15.0 g. of polyoxyethylated and completely hydrogenated castor oil (having 60–80 oxyethylene units per unit of completely hydrogenated ricinoleic acid triglyceride).

*Example 4*

A similar solution containing 25 mg./ml. of active substance is obtained analogously to Example 1 by replacing in the otherwise unchanged composition, the polyoxyethylated castor oil by 20.0 g. of polyoxyethylated ricinoleic acid (having 30–40 oxyethylene units per ricinoleic acid unit).

*Example 5*

(a) 2.5 g. of 2-ethoxy-4-n-propyl-phenoxyacetic acid diethylamide are dissolved while gently heating, in a mixture of 15.0 g. of polyoxyethylated castor oil (density 1.050–1.070 at 25°, viscosity 550–850 centipoises at 25°, saponification number 56–66, hydroxyl number 57–80 commercially available as Cremophor EL), and 10.0 g. of propylene glycol. 2.5 g. of Kollidon 25 and 1.5 g. of glucose are dissolved in 60 g. of distilled water. The two solutions are mixed and made up to 100 ml. with distilled water. After filtering through a glass filter G4, the solution is filled into 5 or 10 ml. colorless ampoules and sterilized for 20 minutes in an autoclave at 120° and 1 atmosphere gauge. The solutions so produced contain 25 mg./ml. of active substance, the viscosity of this solution is 10.42 centistokes at 20°.

(b) A solution having the same content of active substance is obtained by using 15.0 g. of propylene glycol, 5.0 g. of Kollidon 25, no glucose and the same amount of the other components as under (a).

(c) By using 3.2 g. of active substance, 17.5 g. of Cremophor EL, 5.0 g. of propylene glycol and 1.0 g. of Kollidon 25 in the composition described under (a), a similar solution is obtained.

(d) A similar solution is obtained on using 2.5 g. of active substance 20.0 g. of Cremophor EL 5.0 g. of propylene glycol, 3.0 g. of Kollidon 25 and 1.0 g. of glucose analogously to (a).

*Example 6*

On using 5.0 g. of 2-ethoxy-4-n-propyl-phenoxyacetic acid diethylamide analogously to Example 5(a), solutions containing 5% (v./w.) of active substance are obtained.

*Example 7*

2.5 g. of 2-ethoxy-4-n-propyl-phenoxyacetic acid diethylamide are dissolved, while slightly heating, in a mixture of 20.0 g. of a mixture of polyoxyethylated castor oil (50–70 ethylene oxide units for each ricinoleic acid triglyceride unit) and polyoxyethylated, completely hydrogenated castor oil (50 to 60 ethylene oxide units) in a weight ratio of unhydrogenated to hydrogenated castor oil components of about 1:1, and 10.0 g. of glycerol. 1.5 g. of biologically tested poly-(N-vinyl-2-pyrrolidone) with an average molecular weight of 20,000–25,000 (Kollidon) is dissolved in 60 g. of distilled water. The two solutions are mixed and made up to 100 ml. with distilled water. After filtration through a glass filter G4, the solution is filled into colorless 5 or 10 ml. ampoules and sterilized in an autoclave for 20 minutes at 120° and 1 atmosphere gauge pressure. The solution so produced contain 25 mg./ml. of active substance.

*Example 8*

A similar solution containing 25 mg./ml. of active substance is obtained by repeating Example 7, but using 12.0 g. of triethylene glycol in lieu of glycerin used therein.

*Example 9*

A similar solution containing 25 mg./ml. of active substance is obtained by repeating Example 1, but using, in lieu of the active substance employed therein, 2.5 g. of 2-methoxy-4-n-propyl-phenoxyacetic acid N-ethyl-N-ethoxamide.

We claim:
1. An intravenously injectable anesthetic composition, consisting essentially of

(a) from about 1 to 5% (weight/volume) of a member selected from the group consisting of 2-lower alkoxy - 4 - lower alkyl-phenoxyacetic acid-N,N-di-(lower alkyl)-amide and 2-lower alkoxy-4-lower alkyl-phenoxy-acetic acid-N-ethyl-N-ethoxamide;
(b) from about 10 to 25% (weight/volume) of a condensation product of
  (α) a member selected from the group consisting of ricinoleic acid, hydrogenated ricinoleic acid and the monoglycerides, diglycerides and triglycerides of these acids, with
  (β) from about 30 to 90 molar equivalents, per molar equivalent of (α), of ethylene oxide;
(c) from about 5 to 15% (weight/volume) of a pharmaceutically acceptable propylene glycol-type solvent selected from the group consisting of propylene glycol, glycerol, and triethylene glycol, miscible with (b) and in all proportions with water; and
(d) from about 1 to 5% (weight/volume) of poly-(N-vinyl-2-pyrrolidone) having a mean molecular weight of about 20,000 to 25,000;
(e) from 0 to 1.5% of glucose;
(f) the balance being distilled water;
all percentages being expressed as weight per total volume of the composition.

2. A composition as defined in claim 1, wherein the component (a) is 2-ethoxy-4-n-propylphenoxy acetic acid diethylamide.

3. A composition as defined in claim 1, wherein component (a) is present in an amount from 2.5 to 3.5%; component (b) is present in an amount of 15 to 20%; component (c) is present in an amount of 8 to 12%; and component (d) is present in an amount of 2 to 3%.

4. An intravenously injectable anesthetic composition consisting essentially of (a) from about 2.5 to 3.5% (weight/volume) of 2-ethoxy-4-n-propyl-phenoxyacetic acid diethyl amide;
(b) from about 15 to 20% (weight/volume) of castor oil polyoxyethylated with from 50 to 70 moles of ethylene oxide per mole of ricinoleic acid triglyceride;
(c) from about 8 to 12% (weight/volume) of propylene glycol;
(d) from about 1.5 to 3% (weight/volume) of poly-(N-vinyl-2-pyrrolidone), having a mean molecular weight of about 20,000 to 25,000; and
(e) from 0 to 1.5% (weight/volume) of glucose;
(f) the balance consisting of distilled water;
all percentages being expressed as weight per total volume of the composition.

References Cited by the Examiner

UNITED STATES PATENTS

| | | | |
|---|---|---|---|
| Re. 19,569 | 5/1935 | Goldberg | 167—52.5 |
| 2,382,546 | 8/1945 | Curtis | 167—52.5 |
| 3,027,407 | 3/1962 | Major | 167—52.5 |
| 3,044,931 | 7/1962 | Holstius | 167—52.5 |
| 3,070,499 | 12/1962 | Mullins | 167—58.1 |
| 3,172,805 | 3/1965 | De Salva | 167—52.5 |
| 3,220,923 | 11/1965 | Scholtan | 167—52 |

OTHER REFERENCES

Chemical Abstracts 54: 5008d (1960).

ALBERT T. MEYERS, *Primary Examiner.*

JULIAN S. LEVITT, *Examiner.*

JEROME D. GOLDBERG, *Assistant Examiner.*